(12) United States Patent
Dai et al.

(10) Patent No.: US 11,842,070 B2
(45) Date of Patent: Dec. 12, 2023

(54) DEVICE AND METHOD FOR PICKING UP TOP K VALUES

(71) Applicant: MONTAGE TECHNOLOGY CO., LTD., Shanghai (CN)

(72) Inventors: Jie Dai, Shanghai (CN); Chunyi Li, Shanghai (CN); Zhijie Liu, Shanghai (CN); Zhongyuan Chang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 23 days.

(21) Appl. No.: 17/709,454

(22) Filed: Mar. 31, 2022

(65) Prior Publication Data

US 2022/0334762 A1    Oct. 20, 2022

(30) Foreign Application Priority Data

Apr. 14, 2021    (CN) .......................... 202110400296.6

(51) Int. Cl.
*G06F 3/06*        (2006.01)
*G06F 9/30*        (2018.01)

(52) U.S. Cl.
CPC .......... *G06F 3/0656* (2013.01); *G06F 3/0604* (2013.01); *G06F 3/0673* (2013.01); *G06F 9/30021* (2013.01)

(58) Field of Classification Search
CPC .... G06F 3/0656; G06F 3/0604; G06F 3/0673; G06F 7/22; G06F 9/30021; G06F 9/30138; G06F 9/544; G06F 9/5044; G06F 9/5038; G06F 9/54; G06F 9/50; G06F 7/12; G06F 7/10; G06F 7/06
See application file for complete search history.

(56) References Cited

U.S. PATENT DOCUMENTS

2013/0097187 A1*    4/2013    Ingle .................... G06F 7/36
                                                                707/752

FOREIGN PATENT DOCUMENTS

WO    WO-2022179023 A1 *    9/2022

* cited by examiner

*Primary Examiner* — Charles Rones
*Assistant Examiner* — Hewy H Li
(74) *Attorney, Agent, or Firm* — Jun He Law Offices P.C.; James J. Zhu

(57) ABSTRACT

The application discloses a device and a method for picking up top k values from N values. The method comprises: A) controlling a buffer to receive values into a data pool until the number of values in the data pool reaches the predetermined memory size; B) dividing the values in the data pool into a first portion and a second portion; C) discarding the values in the second portion and controlling the buffer to continue to receive values into the data pool; D) repeating steps B to C until the buffer has received all the N values; E) dividing the values in the data pool into the first portion and the second portion until the number of values in the first portion reaches k; and F) controlling the buffer to output the k values in the first portion as the top k values.

22 Claims, 5 Drawing Sheets

DEVICE AND METHOD FOR PICKING UP TOP K VALUES

FIELD OF THE INVENTION

The disclosure generally relates to computer technology, and more particularly, to a device or a method for picking up top k values from a plurality of values.

BACKGROUND

Picking up top k values from a large data set is a common problem in the field of computer technology. Bitonic logic is often used to pick up top k values (maximum or minimum values) from a large data set: first a Bitonic sequence is performed on the large data set, then a Bitonic Merge is performed, and the entire large data set can be sorted after multiple loops. In order to perform a Bitonic logical sorting on a large data set in which the number of values is $k=2^n$, the total number of comparison operations is definite, that is, a total of $n(n+1)k/4$ comparison operations are required.

It can be seen that although the number of operations of the Bitonic logic sorting is definite, the number of operations is relatively large, and the operations are relatively complicated. In addition, since the Bitonic logical may sort the entire data set, in order to move the maximum values to the head of the data sequence and move the minimum values to the end of the data sequence, it may require a large number of data movement operations. When the data is moved, the identification (ID) of corresponding data also needs to be moved accordingly. These mean that the system may require complex pipeline connections, reserve larger space for data movement and take higher power consumption.

Therefore, there is a need for a new device and method for picking up top k values from a data set.

SUMMARY

An objective of the present application is to provide a device and a method for picking up top k values from N values.

In one aspect of the present application, a device for picking up top k values from N values is provided. The device comprises a buffer which includes a data pool having a predetermined memory size, wherein the buffer is configured to receive the N values in batches into the data pool. The device also comprises a processor which is coupled to the buffer, wherein the processor is configured to: A) control the buffer to receive values into the data pool until the number of values in the data pool reaches the predetermined memory size; B) divide the values in the data pool into a first portion and a second portion based on their comparison to an adjustable threshold value until the number of values in the first portion falls into a predetermined range; C) discard the values in the second portion and control the buffer to continue to receive values into the data pool until the number of values in the data pool reaches the predetermined memory size again or the buffer has received all the N values; D) repeat steps B to C until the buffer has received all the N values; E) divide the values in the data pool into the first portion and the second portion based on their comparison to the adjustable threshold value, until the number of values in the first portion reaches k; and F) control the buffer to output the k values in the first portion as the top k values.

In some embodiments, when performing step B and step E, the processor is further configured to adjust the adjustable threshold value based on an adjustable step value in response to that the number of values in the first portion is not within the predetermined range or the number of values in the first portion does not reach k.

In some embodiments, before performing step B and step E, the processor is further configured to: determine a maximum value and a minimum value of the values in the data pool; and determine an initial threshold value based on the maximum value and the minimum value.

In some embodiments, before performing step B and step E, the processor is further configured to: determine an initial step value based on the maximum value and the minimum value.

In some embodiments, before performing step B and step E, the processor is further configured to determine the initial threshold value as a half of a sum of the maximum value and the minimum value, and determine the initial step value as a quarter of the difference between the maximum value and the minimum value.

In some embodiments, when performing step B and step E, the processor is further configured to adjust the adjustable step value to a half of a current step value in response to that the adjustable threshold value is adjusted.

In some embodiments, the predetermined memory size is 2k values

In some embodiments, the predetermined range is greater than or equal to k values and less than 1.5k values.

In some embodiments, the buffer is a first buffer and the device further comprises a second buffer coupled to the first buffer, and the second buffer is configured to receive values after the number of values in the data pool reaches the predetermined memory size.

In some embodiments, step C includes controlling the first buffer to continue to receive values from the second buffer into the data pool until the number of values in the data pool reaches the predetermined memory size again.

In some embodiments, when controlling the buffer to receive values into the data pool, the process is further configured to determine whether to receive a value based on the adjustable threshold value.

In another aspect of the present application, a method for picking up top k values from N values is provided. The method comprises: A) controlling a buffer to receive values into a data pool of the buffer until the number of values in the data pool reaches a predetermined memory size of the data pool; B) dividing the values in the data pool into a first portion and a second portion based on their comparison to an adjustable threshold value until the number of values in the first portion falls into a predetermined range; C) discarding the values in the second portion and controlling the buffer to continue to receive values into the data pool until the number of values in the data pool reaches the predetermined memory size again or the buffer has received all the N values; D) repeating steps B to C until the buffer has received all the N values; E) dividing the values in the data pool into the first portion and the second portion based on their comparison to the adjustable threshold value, until the number of values in the first portion reaches k; and F) controlling the buffer to output the k values in the first portion as the top k values.

The foregoing is a summary of the present application, which may be simplified, summarized, and details omitted. Therefore, a person skilled in the art should recognize that this part is merely an illustrative example and is not intended to limit the scope of the application in any way. This summary is neither intended to identify the key or required characteristics of the subject matter claimed to be protected nor is it intended to be an adjunct to determining the scope of the subject matter claimed to be protected.

BRIEF DESCRIPTION OF THE DRAWINGS

The foregoing and other features of the present application will be more fully understood from the following description and the appended claims taken in conjunction with the accompanying drawings. It is to be understood that these accompanying drawings merely illustrate certain embodiments in accordance with the present disclosure and should not be considered as limiting the scope of the present application. The present disclosure will be illustrated more clearly and in more detail with the accompanying drawings.

DETAILED DESCRIPTION OF THE DRAWINGS

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 1:
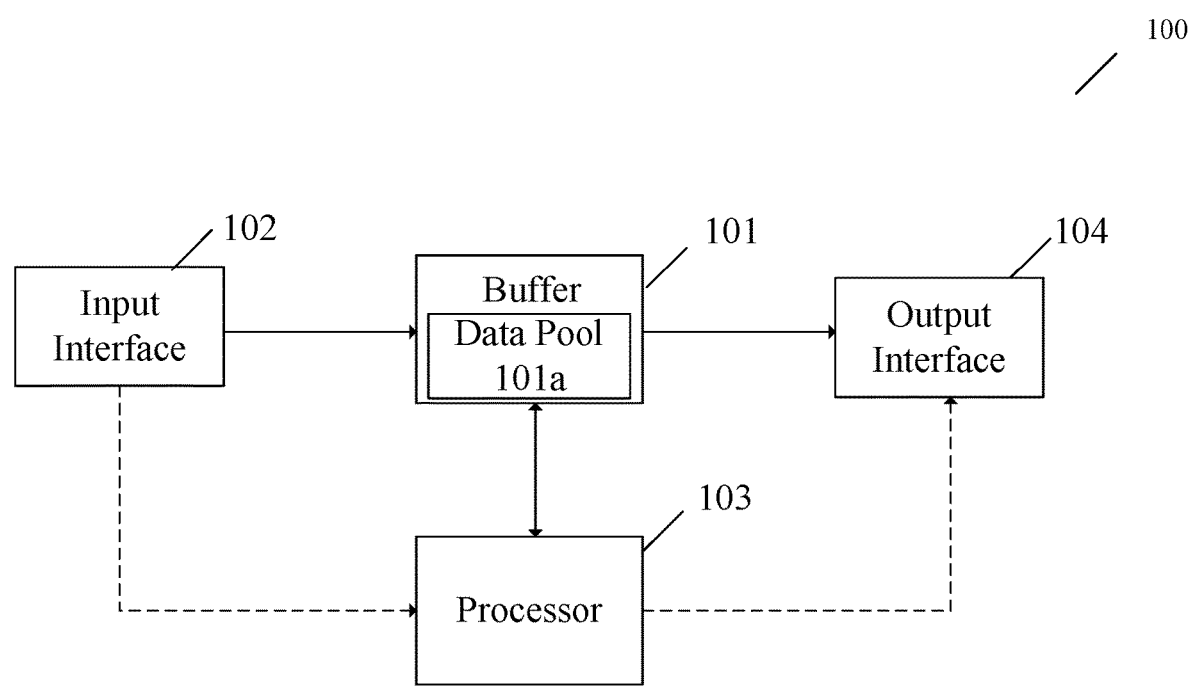
FIG. 1 illustrates a device for picking up top k values according to an embodiment of the present application.

FIG. 1 illustrates a device 100 for picking up top k values according to an embodiment of the present application.

As shown in FIG. 1, the device 100 includes a buffer 101 which can be coupled to an input interface 102 so as to receive from the input interface 102 a set of values for picking up top k values, for example, receiving the values from the input interface 102 in batches. The buffer 101 includes a data pool 101a, and the buffer 101 may receive values from the input interface 102 into the data pool 101a. The data pool 101a has a predetermined memory size.

It should be noted that, in addition to the data pool 101a, the buffer 101 may also have other memory spaces, and these other memory spaces may be configured as not storing the values from which the top k values are to be picked up. Of course, the buffer 101 can also use its entire memory space as the data pool 101a, that is, the predetermined memory size of the data pool 101a is the entire memory space of the buffer 101. The present application is not limited to any of those embodiments. The predetermined memory size of the data pool 101a can be configured according to the number of values from which the top k values are to be picked up, and each time the number of values in the data pool 101a reaches the predetermined memory size, the values in the data pool 101a may be processed (described in detail below).

The buffer 101 may be coupled to an output interface 104 to output the final selected top k values. The buffer 101 can also be coupled to a processor 103 to send various data to a processor 103, including but not limited to the stored values, the number of values, the operation parameters, etc., so as to facilitate the processor 103 to control the buffer 101.

The device 100 also includes the processor 103 which may be coupled to the buffer 101 to control the operations of the buffer 101 and process the data. The processor 103 may be coupled to the input interface 102 or may have an additional input interface (not shown), to receive control instructions from a user or from other programs, controllers, etc. before or during operations. The user can also pre-edit the control instructions of the processor 103 before the operation of the device 100. The processor 103 may operate according to the received control instructions or pre-stored control instructions. In some embodiments, the processor 103 may store parameters for controlling the operations of the buffer 101, such as a predetermined range of the data pool 101a, a threshold value, a step value (described in detail below) and the like. The processor 103 may also be coupled to the output interface 104 or may have an additional output interface (not shown) to output its control instructions and stored parameters, etc., so as to facilitate the user to monitor the device 100. In some embodiments, the processor 103 may be implemented as a state machine.

Figure 2:
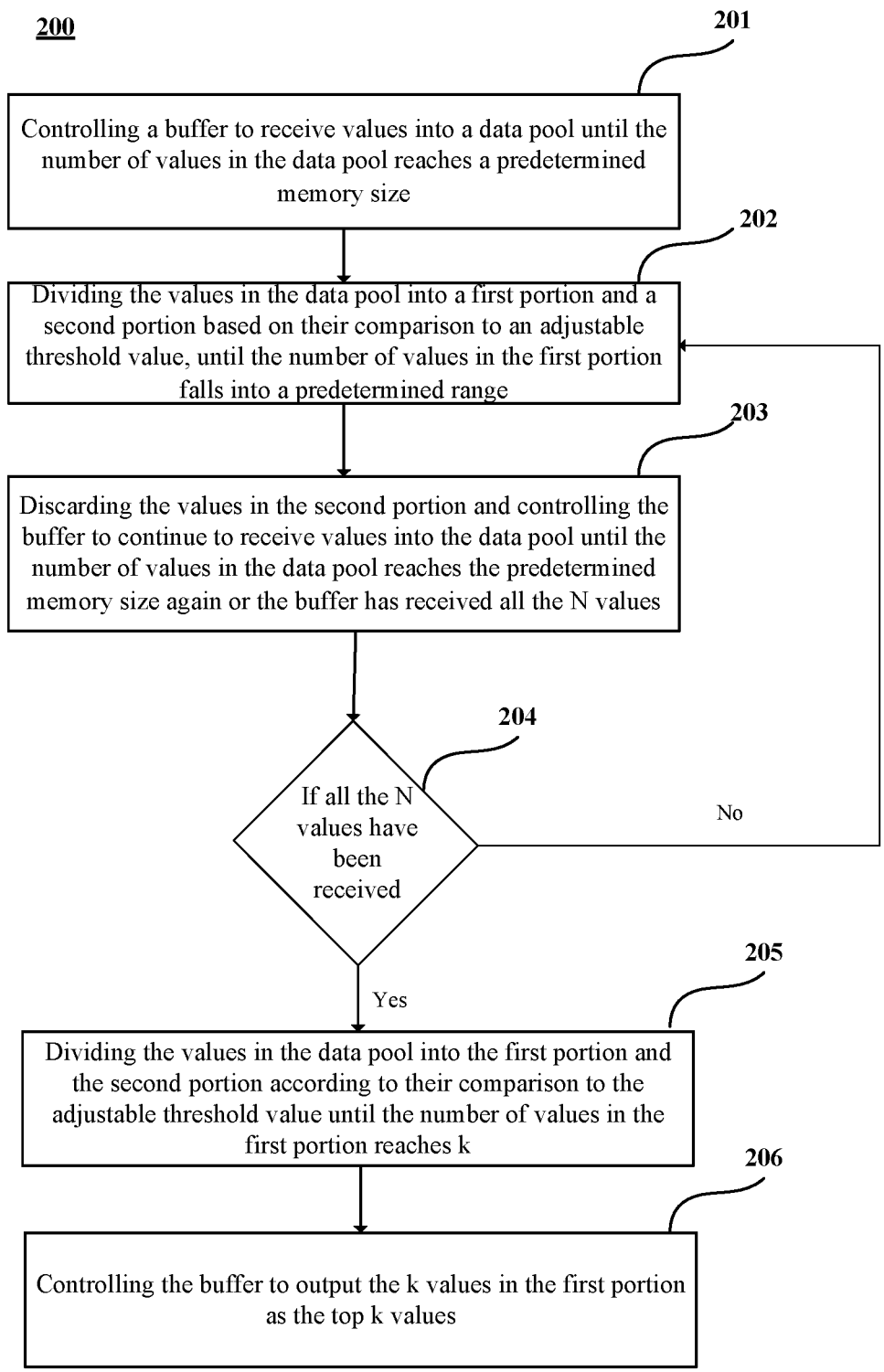
FIG. 2 illustrates a method for picking up top k values according to an embodiment of the present application.

FIG. 2 shows a method 200 for picking up top k values from N values according to an embodiment of the present application, which may be performed by, for example, the device 100 shown in FIG. 1. For the convenience of description, the method 200 will be described below in conjunction with the device 100, but those skilled in the art can understand that the method 200 may also be performed by other devices. In addition, for the convenience of description, the N values will be described as including $a_1, a_2, a_3 \ldots a_N$, and the top k values will be described as including $m_1, m_2, m_3 \ldots m_k$, where N is a positive integer and k is a positive integer less than N.

The method 200 may include a step 201: controlling a buffer to receive values into a data pool until the number of values in the data pool reaches a predetermined memory size.

Specifically, under the control of the processor 103, the buffer 101 can receive data to be processed (that is, the N values) into the data pool 101a in batches, until the number of values in the data pool 101a reaches its predetermined memory size. It can be understood that the N may be much larger than the predetermined memory size, so the values need to be processed in multiple batches. In one embodiment, the predetermined memory size of the data pool 101a may be set as 2k. In such an embodiment, for example, when receiving values for the first time, the buffer 101 may receive values $a_1 \sim a_{2k}$ from the N values $a_1, a_2, a_3 \ldots a_{2k} \ldots a_N$.

The method 200 may include a step 202: dividing the values in the data pool into a first portion and a second portion based on their comparison to an adjustable threshold value, until the number of values in the first portion falls into a predetermined range.

Specifically, when the number of values in the data pool 101a reaches the predetermined memory size, the values in the data pool 101a may be processed to divide these values, thereby selectively retaining some values and discarding other values. The values in the data pool 101a may be divided according to the function of the device 100. For example, when the device 100 is configured to pick up k maximum values from the N values, the device 100 may divide the values greater than the adjustable threshold value into the first portion and divide the values less than the adjustable threshold value into the second portion; similarly, when the device 100 is configured to pick up k minimum values from the N values, the device 100 may divide the values less than the adjustable threshold value into the first portion and divide the values larger than the adjustable threshold value into the second portion. In other words, the device 100 may divide the values that conform to the trend of the target top k values into the first portion, and divides the values that do not conform to the trend of the target top k values into the second portion.

In one embodiment, the device 100 determines an initial threshold value $T_0$ before processing the values in the data pool 101a. It can be understood that since each time the 2k values to be processed are uncertain, using the initial threshold value $T_0$ to divide the 2k values may cause the number of values in the first portion to be out of the predetermined range. Therefore, when the number of values in the first portion is not within the predetermined range, the threshold value is adjusted. If the device 100 is configured to pick up k maximum values from the N values, when the number of values in the first portion is greater than the predetermined range, the initial threshold value $T_0$ may be adjusted to a larger threshold $T_1$, and the values in the data pool 101a may then be divided based on the adjusted threshold value $T_1$. In that case, since there should be fewer values greater than the adjusted threshold value $T_1$, the number of values in the first portion should decrease. On the contrary, when the number of values in the first portion is less than the predetermined range, the initial threshold $T_0$ may be adjusted to a smaller threshold value $T_1$, and the values in the data pool 101a may then be divided based on the adjusted threshold value $T_1$. In that case, since there should be more values greater than the adjusted threshold value $T_1$, the number of values in the first portion should increase. Similarly, if the device 100 is configured to pick up k minimum values from the N values, when the number of values in the first portion is greater than the predetermined range, the initial threshold value $T_0$ may be adjusted to a smaller threshold value $T_1$, and the values in the data pool 101a may then be divided based on the adjusted threshold value $T_1$. In that case, since there should be fewer values less than the adjusted threshold value $T_1$, the number of values in the first portion should decrease. On the contrary, when the number of values in the first portion is less than the predetermined range, the initial threshold $T_0$ may be adjusted to a larger threshold $T_1$, and the values in the data pool 101a may then be divided based on the adjusted threshold value $T_1$. In that case, since there should be more values less than the adjusted threshold $T_1$, the number of values in the first portion should increase. By that analogy, a threshold value $T_n$ can be obtained after the device 100 performs the above operation one or more times, and the threshold value $T_n$ can make the number of values in the first portion fall into the predetermined range.

The device 100 may determine the above-mentioned predetermined range based on the predetermined memory size of the data pool 101a. For example, in an embodiment that the predetermined memory size of the data pool 101a is 2k, the predetermined range may be determined as greater than or equal to k and less than 1.5k.

Figure 3:
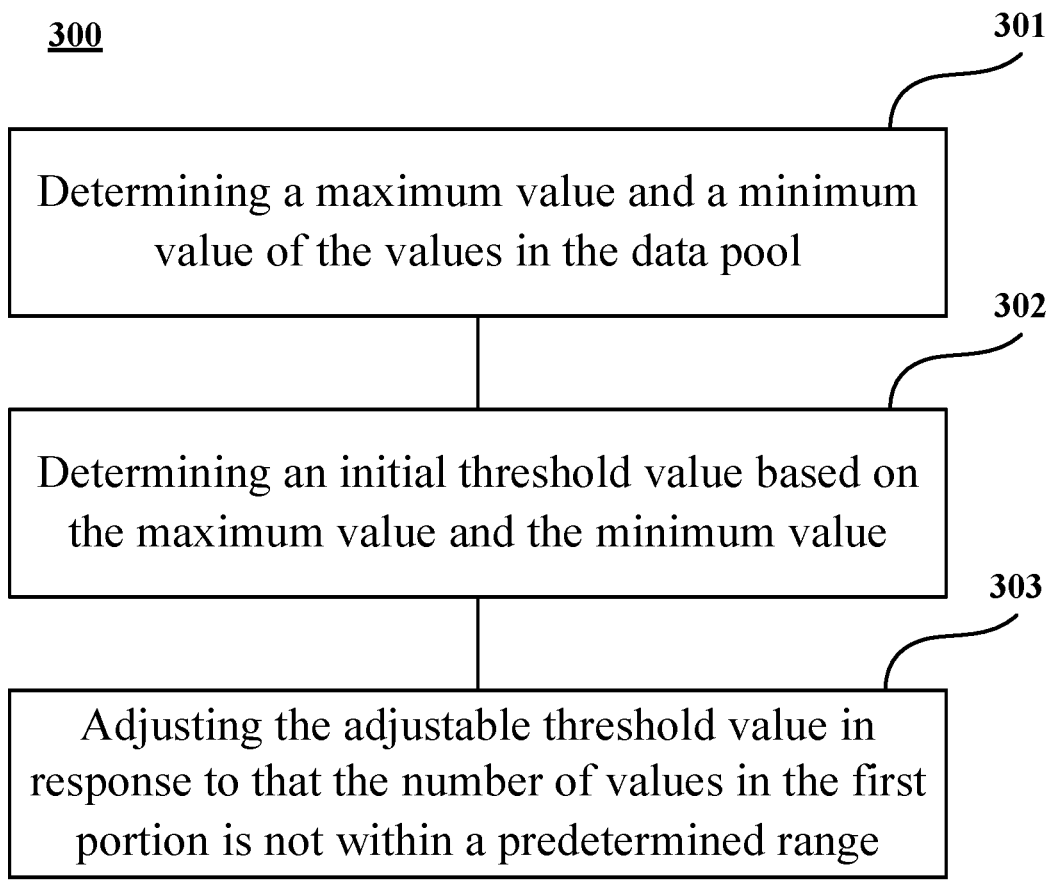
FIG. 3 illustrates a method for processing values in a buffer according to an embodiment of the present application.

Referring now to FIG. 3 which illustrates a method 300 for adjusting the threshold value according to an embodiment of the present application. The method 300 may be performed by, for example, the device 100 shown in FIG. 1 and may be a portion of the method 200 shown in FIG. 2 for picking up k top k values from the N values. For the convenience of description, the method 300 will be described below in conjunction with the device 100, but those skilled in the art can understand that the method 300 may also be performed by other devices.

The method 300 may include a step 301: determining a maximum value and a minimum value of the values in the data pool.

In one embodiment, while the buffer 101 receives values, the device 100 may monitor the received values in real time, so as to update the maximum value $a_{max}$ and the minimum value $a_{min}$ in real time. For example, in one embodiment, when the buffer 101 receives the first value $a_1$, the device 100 determines the value $a_1$ as the maximum value $a_{max}$ and the minimum value $a_{min}$. When the buffer 101 receives the second value $a_2$, the device 100 may compare the value $a_2$ with the current maximum value $a_{max}$ and the current minimum value $a_{min}$ (both are $a_1$ at this time): if $a_2$ is greater than $a_1$, then the maximum value $a_{max}$ is updated to $a_2$ and the minimum value $a_{min}$ remains as $a_1$; if $a_2$ is less than $a_1$, then the minimum value $a_{min}$ is updated to $a_2$ and the maximum value $a_{max}$ remains as $a_1$. By this analogy, the device 100 may compare each newly received value with the current maximum value $a_{max}$ and the minimum value $a_{min}$, so as to update the maximum value $a_{max}$ and the minimum value $a_{min}$ in real time. When the last value in the current batch of values is received (at this time the number of values in the data pool 101a reaches the predetermined memory size), the device 100 can determine the maximum value $a_{max}$ and the minimum value $a_{min}$ of this batch of values.

In another embodiment, the device 100 may also determine the maximum value $a_{max}$ and the minimum value $a_{min}$ of this batch of values after the buffer 101 receives the last value in this batch. For example, the device 100 may sort the values in the data pool 101a (e.g., bubble sorting) to determine the maximum value $a_{max}$ and the minimum value $a_{min}$ in this batch of values.

The method 300 may include a step 302: determining an initial threshold value based on the maximum value and the minimum value.

After determining the maximum value $a_{max}$ and the minimum value $a_{min}$ of the values in the data pool 101a, the device 100 may determine an initial threshold value $T_0$ based on the maximum value $a_{max}$ and the minimum value $a_{min}$. For example, in one embodiment, prior to processing the values in the data pool 101a, the initial threshold value $T_0$ may be determined as a half of a sum of the maximum value $a_{max}$ and the minimum value $a_{min}$ according to Equation (1):

$$T_0=(a_{max}+a_{min})/2 \quad \text{Equation (1)}$$

The method 300 may include a step 303: adjusting the adjustable threshold value in response to that the number of values in the first portion is not within a predetermined range.

The adjustable threshold value may be adjusted in response to that the number of values in the first portion is not within the predetermined range, thereby adjusting the number of values in the first portion.

In one embodiment, in addition to the adjustable threshold value T, the device 100 may also be configured with or determine an adjustable step value S, and the adjustable threshold value T may be adjusted based on the adjustable step value S. In one embodiment, before processing the values in the data pool 101a, the device 100 may determine an initial step value $S_0$ based on the determined maximum value $a_{max}$ and minimum value $a_{min}$ of the values in the data pool 101a. For example, when the device 100 determines the initial threshold value $T_0$ as a half of a sum of the maximum value $a_{max}$ and the minimum value $a_{min}$, the device 100 may determine the initial step value $S_0$ as a quarter of the difference between the maximum value $a_{max}$ and the minimum value $a_{min}$ according to Equation (2):

$$S_0=(a_{max}-a_{min})/4 \quad \text{Equation (2)}$$

As described above, the adjustable threshold value should be adjusted when the number of values in the first portion is not within the predetermined range. In one embodiment, when the threshold value needs to be increased, the threshold value may be adjusted as current threshold value plus current step value; when the threshold value needs to be decreased, the threshold value may be adjusted as current threshold value minus current step value. For example, when the initial threshold value $T_0$ is determined based on Equation (1) and the initial step value $S_0$ is determined based on Equation (2), if the number of values in the first portion obtained after first processing the values in the data pool 101a based on the initial threshold value $T_0$ is not within the predetermined range, the adjusted threshold value $T_1$ can be determined according to Equation (3) or (4) as:

$$T_1 = (a_{min} + a_{max})/2 + (a_{max} - a_{min})/4 = (3a_{max} + a_{min})4 \quad \text{Equation (3)}$$

or $$T_1 = (a_{min} + a_{max})/2 - (a_{max} - a_{min})/4 = (a_{max} + 3a_{min})4 \quad \text{Equation (4)}$$

In one embodiment, in response to that the adjustable threshold value is adjusted, the adjustable step value may be adjusted accordingly. In one embodiment, in response to that the threshold value is adjusted, the step value is adjusted to a half of the current step value. For example, if the threshold value is adjusted according to Equation (3) or Equation (4), a new step value $S^1$ can be determined as a half of $S_0$ according to Equation (5):

$$S_1 = S_0/2 = (a_{max} - a_{min})/8 \quad \text{Equation (5)}$$

Those skilled in the art can understand that the threshold value can also be adjusted in other ways. For example, the threshold value may be adjusted to double or a half of the current threshold value, or as the current threshold value plus or minus a fixed constant, in response to that the number of values in the first portion is not within the predetermined range. In addition, in the embodiment that the threshold value is adjusted through a step value, the step value can also be adjusted in other ways. For example, after adjusting the threshold value, the step value may be adjusted as the current step value minus a fixed constant.

Through the above steps 301-303, the threshold value may be adjusted one or several times, so as to finally obtain a threshold value $T_n$ which can make the number of values in the first portion fall within the predetermined range.

Returning back to FIG. 2, the method 200 may include a step 203: discarding the values in the second portion and controlling the buffer to continue to receive values into the data pool until the number of values in the data pool reaches the predetermined memory size again or the buffer has received all the N values.

After processing the values in the buffer 101 (via step 202), the device 100 discards the values in the second portion since the values in the second portion are not desired values. After discarding those values, the number of values remaining in the data pool 101a is less than the predetermined memory size of the data pool 101a, so other values of the N values can continue to be received into the data pool 101a. The buffer 101 is controlled to continue to receive values until the number of values in the data pool 101a reaches the predetermined memory size of the data pool 101a again or the buffer 101 has received all the N values.

When the buffer 101 is controlled to continue to receive values, the device 100 may compare each value to be received with the current threshold value (i.e., the threshold $T_n$ obtained after processing the previous batch of values) to decide whether to receive each value. For example, when the device 100 is configured to pick up k maximum values from the N values, the device 100 may compare each value to be received with the current threshold value $T_n$: the buffer 101 may not receive any values less than the current threshold value $T_n$ and may only receive values greater than the current threshold value $T_n$. Similarly, when the device 100 is configured to pick up k minimum values from the N values, the device 100 may compare each value to be received with the current threshold value $T_n$: the buffer 101 may not receive any values greater than the current threshold value $T_n$ and may only receive values less than the current threshold value $T_n$. In this way, the values that cannot be the top k values can be directly excluded without wasting computing resources for subsequent processing.

After performing step 203, the device 100 performs a step 204: determining whether all the N values have been received. If not all the N values have been received, the method 200 may return to step 202 and perform step 202. Or, if all the N values have been received, the method 200 moves to a step 205.

In one embodiment, if it is not known to the device 100 in advance about the number "N", the device 100 can determine whether the buffer 101 has received all the N values in the following way: if the number of values in the data pool 101a has reached the predetermined memory size of the data pool 101a while there are still values to be pushed to the data pool 101a, it can be determined that the buffer 101 has not received all the N values; if the number of values in the data pool 101a has not reached the predetermined memory size of the data pool 101a while there are no more values to be pushed into the data pool 101a, it can be determined that the buffer 101 has received all the N values. In one embodiment, if it is known to the device 100 in advance about the specific number "N", the device 100 may count the number of received values to determine whether the buffer 101 has received all the N values.

The method 200 may include a step 205: dividing the values in the data pool into the first portion and the second portion according to their comparison to the adjustable threshold value until the number of values in the first portion reaches k.

After the buffer 101 has received all the N values (regardless of whether the number of values in the data pool 101a has reached the predetermined memory size of the data pool 101a), the buffer 101 may also use an adjustable threshold value to compare the values in the data pool 101a. Similar to step 202, the threshold value may be adjusted one or more times to finally make the number of values in the first portion satisfy the condition. Different from step 202, in step 205, the adjustable threshold value should be adjusted so that the number of values in the first portion reaches k. Except that the number of values in the first portion should be k, the processing of the values and the adjustment of the threshold value in step 205 can be the same as those in step 202 and the method 300, and may not be repeated here. Of course, those skilled in the art can understand that step 202 and step 205 may process values and adjust threshold values differently.

The method 200 may include a step 206: controlling the buffer to output the k values in the first portion as the top k values.

After performing steps 201 to 206, the k values in the first portion are the required top k values of the N values. The device 100 can output the k values as the final top k values.

Figure 4:
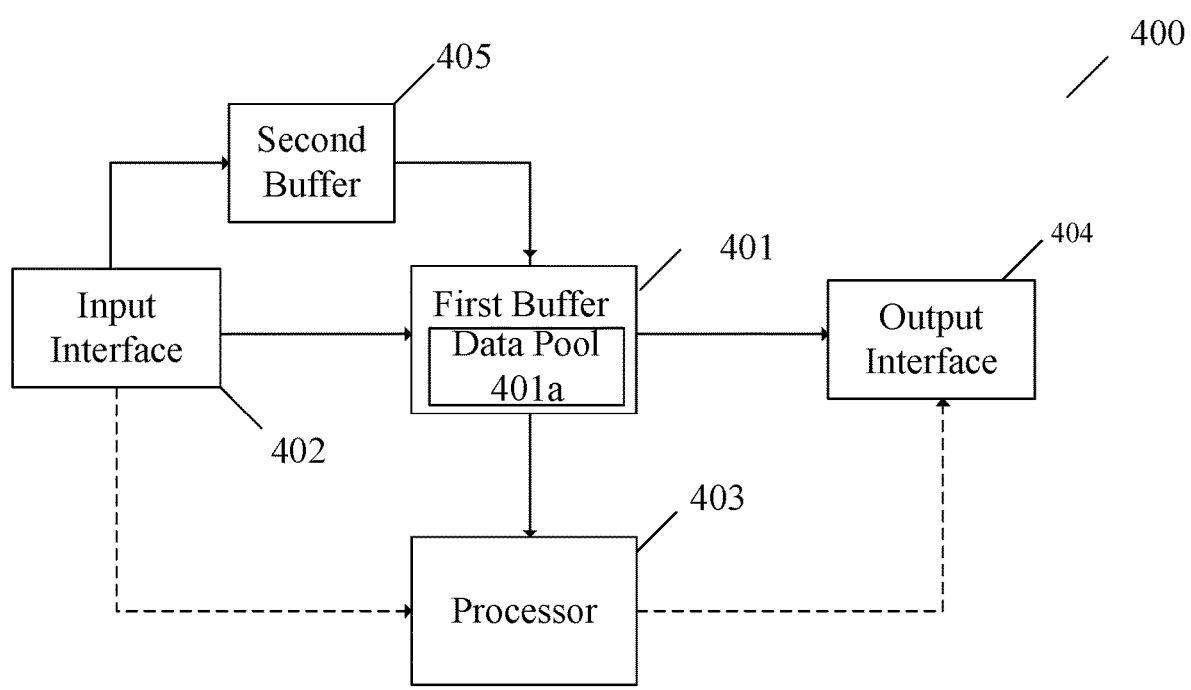
FIG. 4 illustrates a device for picking up top k values according to another embodiment of the present application.

FIG. 4 shows a device 400 for picking top k values according to another embodiment. The device 400 is substantially similar to the device 100, and also includes a buffer 401, a data pool 401a, an input interface 402, a processor 403 and an output interface 404, and can also perform the method 200 and the method 300, which may not be repeated herein. Similarly, in some embodiments, the processor 403 may be implemented as a state machine. Different from the device 100, the buffer 401 in the device 400 is a first buffer, and the device 400 also includes a second buffer 405.

As shown in FIG. 4, the second buffer 405 is coupled to the input interface 402 and the first buffer 401. Different from the device 100, the input interface 402 may continuously input the N values. When the device 400 performs the method of picking up top k values (e.g., the method 200), the number of values in the data pool 401a may reach the predetermined memory size of the data pool 401a. At this time, the first buffer 401 needs to process the values in the data pool 401a first and is unable to further receive values from the input interface 402. When the number of values in the data pool 401a reaches the predetermined memory size, the second buffer 405 instead of the first buffer 401 can continue to receive values from the input interface 402, and the values received during this period may be stored in the second buffer 405. After the first buffer 401 completes the processing of the values in the data pool 401a (at this time, the values in the second portion of the data pool 401a are discarded, so that the number of values in the data pool 401a is less than the predetermined memory size, therefore the first buffer 401 can continue to receive values), the first buffer 401 may continue to receive values from the second buffer 405 into the data pool 401a.

Figure 5:
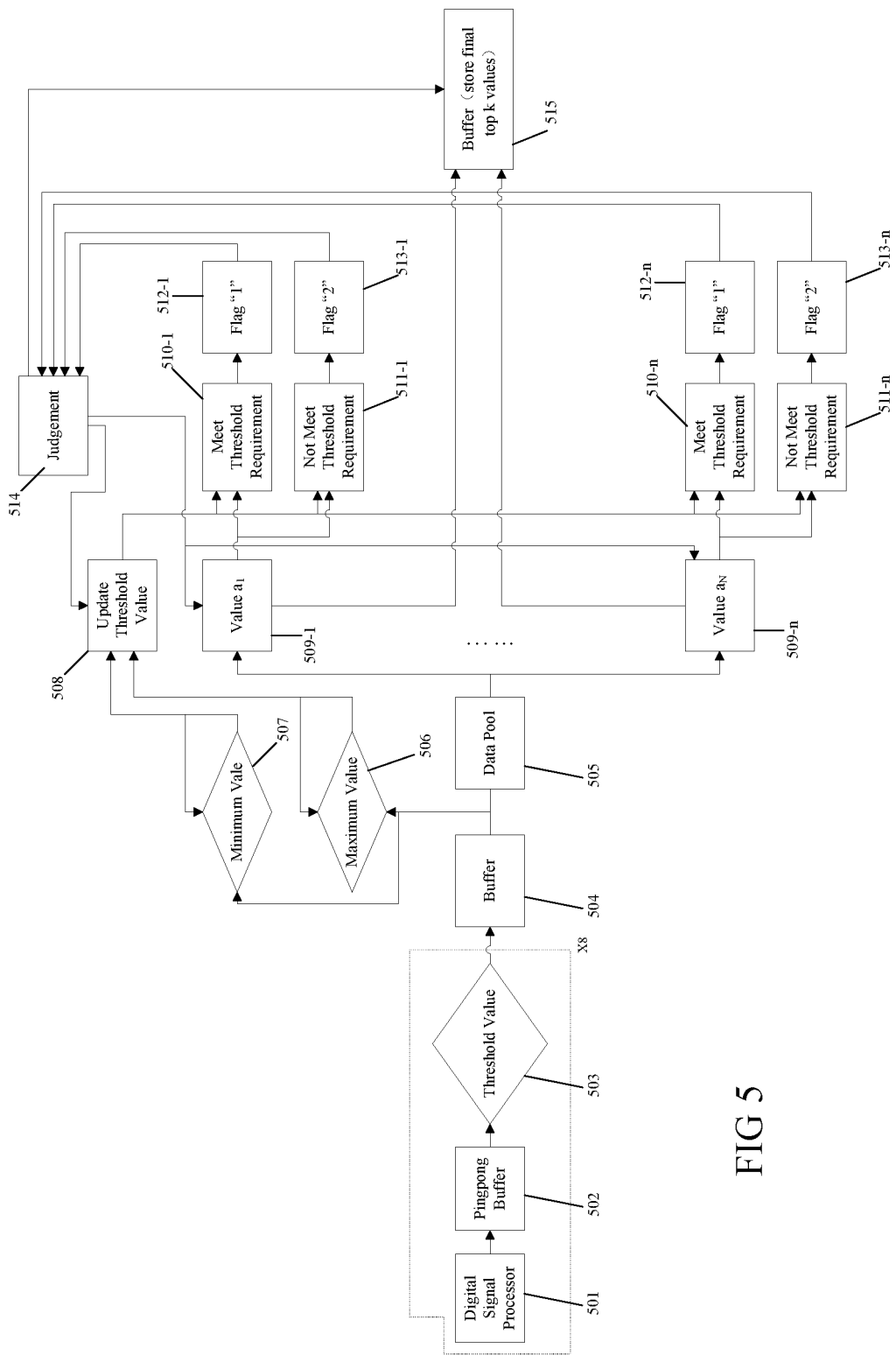
FIG. 5 illustrates an implementation according to an embodiment of the present application.

FIG. 5 shows an implementation 500 of the present application according to another embodiment, which is used to pick up top k values (maximum or minimum values) from N values. For the convenience of description, in the following, the N values will be described as including $a_1, a_2, a_3 \ldots a_N$, and the top k values will be described as including $m_1, m_2, m_3 \ldots m_k$, where N is a positive integer and k is a positive integer less than N.

Referring to FIG. 5, first, the N values is processed by a digital signal processor 501 and then buffered into a pingpong buffer 502, so that the N values can be received without interruption.

Each received value is first compared to the current threshold value T (block 503, e.g., by a comparator), and only the values that meet the requirements of the threshold value T are pushed to the buffer 504 and further into the data pool 505. For example, when picking up k maximum values from the N values, values less than the current threshold value T may not be pushed into the buffer 504 while values greater than or equal to the current threshold T may be pushed into the buffer 504. Similarly, when picking up k minimum values from the N values, values greater than the current threshold T may not be pushed into the buffer 504 while values less than or equal to the threshold T may be pushed into the buffer 504. In this way, the values that cannot be the top k values can be directly excluded without wasting computing resources for subsequent processing. It should be noted that, when pushing the first batch of values to the buffer 504, the initial threshold value $T_0$ can be set as the uppermost or lowermost value that can be processed by the system (in the case of picking up k minimum values from the N values, it is set as the uppermost value that can be processed by the system; in the case of picking up k maximum values from the N values, it is set as the lowermost value that can be processed by the system), that is to say, all values can be pushed at this time into the buffer 504 for subsequent processing.

The buffer 504 provides buffering, and the data pool 505 has two working states: receiving state and comparing state. In the receiving state, the data pool 505 can receive data from the buffer 504 until the buffer 504 or the data pool 505 reaches its reserved memory size. When the buffer 504 is full, it informs its upper stage to suspend operation through a back pressure mechanism.

The data pool 505 has a predetermined memory size. The data pool 505 receives data from the buffer 504 in the receiving state. The predetermined memory size of the data pool 505 can be set based on the number k, e.g., set as 2k. When the number of values in the data pool 505 reaches the predetermined memory size, the data pool 505 enters into the comparing state in which the values therein may be processed, as described below.

When pushing values into the data pool 505, the pushed values are monitored in real time to determine a maximum value $a_{max}$ and a minimum value $a_{min}$ of the values in the data pool 505. As discussed above, each newly pushed value is compared to the current maximum value (block 506, e.g., by a comparator, and the maximum value is stored by a register) and to the current minimum value (block 507, e.g., by a comparator, and the minimum value is stored by a register). The value greater than the current maximum value may be determined as the new maximum value, and the value less than the current minimum value may be determined as the new minimum value. Therefore, when the number of values in the data pool 505 reaches the predetermined memory size of the data pool 505, the maximum value $a_{max}$ and the minimum value $a_{min}$ can be determined. It should be noted that when the first batch of values are pushed to the data pool 505, the first pushed value may be determined as both the maximum value and the minimum value, and subsequently pushed values may be compared accordingly. After the number of values in the data pool 505 reaches the predetermined memory size of the data pool 505 and the maximum and minimum values of the values in the data pool 505 are determined, the current threshold may be updated (block 508, such as through calculations by a calculator, and the threshold is stored by a register), for example, as described above with reference to Equation 1. The threshold may be updated to a half of a sum of the maximum and minimum values.

After the number of values in the data pool 505 reaches the predetermined memory size of the data pool 505, the data pool 505 enters into the comparing state from the receiving state. The values $a_1 \sim a_n$ (blocks 509-1~509-n, for example, each block may represent a memory bit of the data pool 505) are compared with the current threshold value: if a value meets the requirement of the threshold value (blocks 510-1 to 510-n, e.g., by means of a comparator), such value is marked with flag "1" (block 512-1 to 512-n, e.g., the flag is stored by a register); if a value does not meet the requirement of the threshold value (blocks 511-1 to 511-n, e.g., by means of a comparator), such value is marked with flag "2" (block 513-1 to 513-n, e.g., the flag is stored by a register). That is, the values are divided into a first portion and a second portion based on the threshold. As discussed above, when picking up k maximum values from the N values, those values that are greater than the threshold value may be considered as meeting the threshold requirements, and thus may be marked with flag "1" and divided into the first portion; those values that are less than the threshold value may be considered as not meeting the threshold requirement, and thus may be marked with flag "2" and divided into the second portion. Similarly, when picking up k minimum values from the N values, those values that are less than the threshold value may be considered as meeting the threshold requirement, and thus may be marked with flag "1" and divided into the first portion; those values that are greater than the threshold may be considered as not meeting the threshold requirement, and thus may be marked with flag "2" and divided into the second portion. In other words, the values that conform to the trend of the target top k values may be marked with flag "1" and divided into the first portion, and values that do not conform to the trend of the target top k values may be marked with flag "2" and divided into the second portion After dividing the values $a_1$~$a_n$ in the data pool 505 into the first portion and the second portion, the number of values in each portion may be further counted (block 514): if the number of values with flag "1" does not fall into a predetermined range, the threshold may be updated again (block 508). As described above with reference to Equations 2-5, the threshold may be updated one or several times based on a step value. Then the values $a_1$~$a_n$ in the data pool 505 may be divided based on the new threshold value. Finally, a threshold value $T_n$ can be obtained so that the number of values with the flag "1" falls into the predetermined range. If the number of values with flag "1" falls into the predetermined range, the values with flag "2" are discarded, and at this time, the number of values in the data pool 505 is less than the predetermined memory size of the data pool 505. When the data pool 505 only has the values with flag "1", the data pool 505 enters into the receiving state from the comparing state and receives values from the buffer 504 until the data pool is full and enters into the comparing state again. The predetermined range can be determined based on the number k, for example, as described above, it can be determined as greater than or equal to k and less than 1.5k.

The above process can be repeated one or more times until the last batch of values are pushed to the data pool 505. It should be noted that, at this time, the number of values in the data pool 505 may be less than the predetermined memory size. After the last batch of values are pushed into the data pool 505, the maximum and minimum values of these values are also determined to determine a threshold value. The values in the data pool 505 are similarly marked with flag "1" or "2" based on the threshold value. The difference is that at this time, the goal of the threshold adjustment is to make the number of values with flag "1" be k instead of falling into the predetermined range. When the number of values with flag "1" is finally k, such k values are pushed to the buffer 515 as the final picked up k values.

It should be noted that although several modules or sub-modules used in memory controller and several steps of an intensive computation method have been described in the previous paragraphs, such division is exemplary and not mandatory. Practically, according to the embodiments of the present disclosure, the functions and features of two or more modules described above may be embodied in one module. On the other hand, the functions and features of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present disclosure, one element may conduct functions of several technical feature recited in claims. Any reference signs in the claims should not be construed as limiting the scope. The scope and spirit of the present application are defined by the appended claims.

What is claimed is:

1. A device for picking up top k values from N values, wherein k and N are positive integers and k is smaller than N, the device comprises:
   a buffer which includes a data pool having a predetermined memory size, wherein the buffer is configured to receive the N values in batches into the data pool, and wherein N is greater than the predetermined memory size;
   a processor coupled to the buffer, wherein the processor is configured to:
   A) control the buffer to receive values into the data pool until the number of values in the data pool reaches the predetermined memory size;
   B) divide the values in the data pool into a first portion and a second portion based on their comparison to an adjustable threshold value by a comparator, until the number of values in the first portion falls into a predetermined range;
   C) discard the values in the second portion and control the buffer to continue to receive values into the data pool until the number of values in the data pool reaches the predetermined memory size again or the buffer has received all the N values;
   D) repeat steps B to C until the buffer has received all the N values;
   E) divide the values in the data pool into the first portion and the second portion based on their comparison to the adjustable threshold value by the comparator, until the number of values in the first portion reaches k; and
   F) control the buffer to output the k values in the first portion as the top k values; and
   a register which stores a first flag and a second flag, wherein the values in the data pool are marked with the first flag so as to be divided into the first portion and marked with the second flag so as to be divided into the second portion.

2. The device of claim 1, wherein when performing step B and step E, the processor is further configured to adjust the adjustable threshold value based on an adjustable step value in response to that the number of values in the first portion is not within the predetermined range or the number of values in the first portion does not reach k.

3. The device of claim 2, wherein before performing step B and step E, the processor is further configured to:
   determine a maximum value and a minimum value of the values in the data pool; and
   determine an initial threshold value based on the maximum value and the minimum value.

4. The device of claim 3, wherein before performing step B and step E, the processor is further configured to:
   determine an initial step value based on the maximum value and the minimum value.

5. The device of claim 4, wherein before performing step B and step E, the processor is further configured to determine the initial threshold value as a half of a sum of the maximum value and the minimum value, and determine the initial step value as a quarter of a difference between the maximum value and the minimum value.

6. The device of claim 5, wherein when performing step B and step E, the processor is further configured to adjust the adjustable step value to a half of a current step value in response to that the adjustable threshold value is adjusted.

7. The device of claim 1, wherein the predetermined memory size is 2k values.

8. The device of claim 7, wherein the predetermined range is greater than or equal to k values and less than 1.5k values.

9. The device of claim 1, wherein the buffer is a first buffer and the device further comprises a second buffer coupled to the first buffer, and wherein the second buffer is configured to receive values after the number of values in the data pool reaches the predetermined memory size.

10. The device of claim 9, wherein step C comprises controlling the first buffer to continue to receive values from the second buffer into the data pool until the number of values in the data pool reaches the predetermined memory size again.

11. The device of claim 1, wherein when controlling the buffer to receive values into the data pool, the processor is further configured to determine whether to receive a value based on the adjustable threshold value.

12. A method for picking up top k values from N values, wherein k and N are positive integers and k is smaller than N, the method comprises:
   A) controlling a buffer to receive values into a data pool of the buffer until the number of values in the data pool reaches a predetermined memory size of the data pool, and wherein N is greater than the predetermined memory size;
   B) dividing the values in the data pool into a first portion and a second portion based on their comparison to an adjustable threshold value by a comparator, until the number of values in the first portion falls into a predetermined range;
   C) discarding the values in the second portion and controlling the buffer to continue to receive values into the data pool until the number of values in the data pool reaches the predetermined memory size again or the buffer has received all the N values;
   D) repeating steps B to C until the buffer has received all the N values;
   E) dividing the values in the data pool into the first portion and the second portion based on their comparison to the adjustable threshold value by the comparator, until the number of values in the first portion reaches k; and
   F) controlling the buffer to output the k values in the first portion as the top k values;
   wherein the values in the data pool are marked with a first flag stored in a register so as to be divided into the first portion and marked with a second flag stored in the register so as to be divided into the second portion.

13. The method of claim 12, wherein step B and step E further include adjusting the adjustable threshold value based on an adjustable step value in response to that the number of values in the first portion is not within the predetermined range or the number of values in the first portion does not reach k.

14. The method of claim 13, wherein before performing step B and step E, the method further comprises:
   determining a maximum value and a minimum value of the values in the data pool; and
   determining an initial threshold value based on the maximum value and the minimum value.

15. The method of claim 14, wherein before performing step B and step E, the method further comprises:
   determining an initial step value based on the maximum value and the minimum value.

16. The method of claim 15, wherein before performing step B and step E, the method further comprises determining the initial threshold value as a half of a sum of the maximum value and the minimum value, and determining the initial step value as a quarter of the difference between the maximum value and the minimum value.

17. The method of claim 16, wherein when performing step B and step E, the method further comprises adjusting the adjustable step value to a half of a current step value in response to that the adjustable threshold value is adjusted.

18. The method of claim 12, wherein the predetermined memory size is 2k values.

19. The method of claim 18, wherein the predetermined range is greater than or equal to k values and less than 1.5k values.

20. The method of claim 12, wherein the buffer is a first buffer, and the method further comprising receiving values into a second buffer when the number of values in the data pool reaches the predetermined memory size.

21. The method of claim 20, wherein step C comprises controlling the first buffer to receive values from the second buffer into the data pool until the number of values in the data pool reaches the predetermined memory size again.

22. The method of claim 12, wherein when controlling the buffer to receive values into the data pool, the method further comprises determining whether to receive a value based on the adjustable threshold value.

* * * * *